2,835,685

METAL TRIACYLATES OF UNSATURATED HIGHER MOLECULAR MONOCARBOXYLIC ACIDS

Jacobus Rinse, Bernardsville, N. J., assignor to J. W. Ayers & Co., Easton, Pa., a corporation of Delaware No Drawing. Application March 17, 1955
Serial No. 495,061

5 Claims. (Cl. 260—414)

This invention relates to metal triacylates of unsaturated higher molecular monocarboxylic acids and coating compositions containing the same.

An object of the invention is to provide a new series of oils having drying properties rendering them effective in coating compositions, floor coverings and other products where drying oils have heretofore been used.

Another object is to provide a new series of compounds having the capacity of improving the drying properties of drying oils, semi-drying oils and slow-drying oils, and even of imparting drying properties to various non-drying oils.

Yet another object is to provide metal acylates in substantially pure form free from side reaction products whereby their field of use is extended and their performance can be more effectively controlled.

The new series of compounds may be described as aluminum triacylates of unsaturated higher molecular monocarboxylic acids, and especially those of the acids contained in the naturally occurring fats and oils, both animal and vegetable. The principal compounds may be visualized as aluminum oils in which the aluminum atom has replaced the glycerine molecule in usaturated glyceride oils.

The aluminum oils of the invention as a class have been found to possess extraordinary capacity for rapid drying and hardening when exposed to the atmosphere, apparently through partial hydrolysis followed by polymerization and oxidation. This rapid drying will occur in some instances in a period of a few minutes, and the rate can be controlled when the same are incorporated in paints, varnishes and other coating compositions with drying oils, non-drying oils, solvents and diluents.

The metal triacylates can contain the acid radicals of any unsaturated higher molecular acid but in view of economic considerations the acid radicals are preferably derived from natural sources, as linseed oil, soybean oil, sunflower oil and other vegetable oils, and as olein and other animal oils and fats or components thereof all of which have acid radicals of about 10 or more carbon atoms.

In special embodiments of the invention, the acid radicals are supplied by tall oil or by acid components thereof, as rosin acid mixtures and abietic acid or its isomers. In another important embodiment, the acid radicals are derived from castor oil, as ricinoleic acid, and aluminum tri(hydroxy-acylates) are obtained having unique properties.

This action of aluminum triacylates of unsaturated acids in drying and hardening other compounds is the basis of a special adaptation of the invention. These aluminum oils have the capacity for improving the drying and hardening of other oils when mixed therewith.

In one embodiment, they are mixed with an oil which dries by oxidation and polymerization at unsaturated bonds, i. e. a slow drying, a semi-drying or a drying oil, the quantity added being dependent upon the drying qualities and other properties desired. Substantial improvement can be obtained by the addition of as little as ten percent of the aluminum oil but even five percent can impart a noticeable increase in drying rate.

The addition of a small amount, as two to five percent, of one of the common driers, as a lead, a cobalt or a manganese drier, to the above described mixtures will further contribute to the hardening properties by promoting oxidation and polymerization of the aluminum oil.

In another adaptation of the drying qualities of the triacylates contemplated by the invention, protective coating compositions are prepared containing an aluminum triacylate of the character hereinbefore described and a nonvolatile mineral oil (i. e., a hydrocarbon which will not evaporate before polymerization can occur). The composition can contain up to 60% of the mineral oil and also can advantageously contain one of the common metal driers to speed oxidation. These compositions surprisingly will air dry and form a hard, adherent coating.

In preparing the coatings hereinbefore described for application to surfaces to be protected, the compositions may be supplemented by any of the usual paint or varnish additives including solvents, diluents, builders, pigments, etc. The aluminum oils are soluble in volatile hydrocarbons, and therefore compounding is both simple and low in material cost.

The higher molecular unsaturated triacylates of aluminum may be easily obtained in substantially pure form by reacting a higher molecular unsaturated monocarboxylic acid or acid mixture with an aluminum triacylate of a lower molecular monocarboxylic acid in the molar ratio of 3:1 by heating the mixture to a temperature at which reaction occurs by replacement of the lower acid by the higher acid in the aluminum compound, the former being distilled off in the quantity of three mols.

The metal triacylates of the invention may be prepared by a novel process involving first the formation of an intimate liquid or pasty mixture of one mol of an aluminum R-oxide, i. e. an aluminum alkoxide or phenoxide of a volatile alcohol or phenol, respectively, with three mols of a higher molecular unsaturated monocarboxylic acid or acid mixture, warming the mixture and stirring if necessary to improve the homogeneity, next heating the mixture to a temperature at which the reaction proceeds, as from 80° to 100° C., during which time alcohol or phenol of the alkoxy or the phenoxy group forms and evaporates off, and completing the reaction by supplementing the vaporization force of heating by the application of a vacuum, as from 25 to 75 cms. of mercury, during which time the temperature may be raised somewhat, as to 150° C. When three mols of the hydroxyhydrocarbons have been distilled off, the reaction is complete and a substantially pure aluminum triacylate is obtained.

For the production of the acylate in purest form from aluminum isopropylate or other alcoholate, this compound is introduced in powdered condition into the carboxylic acid in the cold and mixed thoroughly before heat is applied to cause the reaction to speed up. If the acid is so viscous that a homogeneous mixture with the alcoholate powder cannot be obtained, then the acid is warmed sufficiently to render it soft, or just liquid preferably before adding the alcoholate, and the mixing is carried out very quickly. Tall oil, for example, can be softened and mixed at about 40° C. and then reacted, and acylates of a purity satisfactory for general purposes are thereby obtained.

The triacylates can also be obtained by reacting under the above described conditions with the exception that the reaction is carried out initially in the presence of a relatively volatile solvent, as hexane or other hydrocarbon, which solvent is and must be vaporized off with the liberated hydroxy-hydrocarbon as the reaction proceeds toward completion and at a temperature below the decomposition temperature of the triacylate formed, in order to complete the reaction and provide acylates free of detrimental amounts of side reaction products as well as hydrocarbons.

*Example 1*

Aluminum isopropoxide is heated to a temperature at which the same melts and then the metastable liquid obtained on cooling, in a quantity of 51 gm., is added to 262.5 gm. of purified tall oil heated to and maintained at a temperature of 65° C. When a homogeneous mass is obtained, heat is applied to increase the temperature. When 78° C. is reached the batch will gel. Upon continuation of the heating and agitating, the temperature is raised gradually to 100° C. and vacuum is applied. After 35 gm. of isopropanol are liberated the temperature is increased gradually to 160° C. at which point the reaction mass becomes a thin fluid and gives up additional alcohol, the total amount released and vaporized off being three mols. The product obtained is aluminum tritallate in a yield of 269 gm. It is a viscous, sticky resin which readily dissolves in mineral spirits and solidifies immediately upon the addition of a little water. When applied in the form of a thin layer and exposed to the air it dries rapidly.

*Example 2*

Liquid aluminum isopropoxide in a quantity of 51 gm. is added to 254 gm. of molten rosin under intensive agitation during heating at 90° C. The gelled mass obtained is put under vacuum and heated slowly to increase the temperature. When the mass reaches 230° C., a thin liquid is obtained, the amount of distillate produced at this point being 53 gm. Although the distillate is composed mostly of the liberated alcohol it contains some hydrocarbon. The residue obtained is a hard resin melting between 150° and 200° C. It is soluble in mineral spirits. When a few drops of water are added to the solution and heated to 100° C. the mass solidifies. The product is composed of aluminum salts of abietic acid and of other rosin acids.

*Example 3*

Finely powdered aluminum isopropoxide in a quantity of 204 gm. is thoroughly mixed with 840 gm. of linseed fatty acids, the mass being heated thereafter at 70° C. until a homogeneous liquid mass is obtained. Thereupon the temperature of the mass is gradually increased to 150° C. under a vacuum and the heating is continued for five minutes at which time 3 mols of isopropanol will have been removed. The resulting triacylate is an oil which is soluble in hydrocarbons and in vegetable and animal oils. When applied as a coating it dries rapidly and forms a water-resistant film.

*Example 4*

Tung oil fatty acids in the amount of 840 gm. are melted at 50° C. and 204 gm. of powdered aluminum isopropoxide are introduced and mixed rapidly therewith. The mixture is heated to 80°–100° C. until the mass is completely homogeneous. The reaction mass is heated to 100°–110° C. and during application of a vacuum finally to 135° C., these conditions being maintained until 180 gm. of isopropanol have been distilled off. The resulting oil is cooled to room temperature. When applied as a coating, it dries rapidly to a hard wax-like film, upon exposure to the atmosphere.

*Example 5*

Oleic acid in the quantity of 840 gm. is mixed with 204 gm. of aluminum triacetate and heated under a vacuum with a gradual increase in temperature. During the heating between 100° and 150° C., 180 gm. of acetic acid are liberated and distilled off. Aluminum trioleate remains in the form of a viscous oil. It is readily soluble in mineral spirits and solidifies upon addition of water or of polyalcohols.

*Example 6*

The process of Example 5 is repeated except that 1000 gm. of tall oil (3 mols) are used instead of oleic acid. A highly viscous resin is obtained which dries and hardens in a short time when applied as a film and exposed to the atmosphere.

*Example 7*

The process of Example 5 is repeated except in this instance 840 gm. of linseed fatty acids are employed instead of oleic acid. The product obtained is a viscous oil having the solubility and solidifying characteristics mentioned in said example.

*Example 8*

Dried castor oil fatty acids in a quantity of 236 gm. are mixed with 51 gm. of powdered aluminum isopropoxide and heated under vigorous agitation until the batch is homogeneous. When the temperature reaches 100° C., isopropanol begins to vaporize off. At 105° C. a low vacuum is applied and gradually increased to 27 inches as the temperature is increased to 155° C. at which temperature the conditions are maintained for thirty minutes. The yield of aluminum tri-ricinoleate is 237 gm. The product is a viscous resin which solidifies on exposure to the air, forming a tough, clear film.

*Example 9*

Linseed oil is mixed with the hereinbefore described aluminum triacylate of linseed oil fatty acids, in the proportion of 75 to 25. When this mixture is applied as a coating and exposed in the air it dries (dry-to-touch) in about 10 minutes.

*Example 10*

Linseed oil is mixed with the aluminum tritallate hereinbefore defined, in the ratio of 70 to 30 and to the mixture there is added a common cobalt drier in a proportion of 5% of the mixture.

*Example 11*

Linseed oil is mixed with the aluminum trioleate hereinbefore described in the proportion of 65 to 35 and a common manganese drier in a proportion of 2% of the mixture is added.

*Example 12*

A mixture of mineral oil (100 S. A. E.) and the aluminum tritallate hereinbefore described are mixed in the ratio of 40 to 60 and 3% of a common mixed lead-cobalt-manganese drier is added. The resulting mixture dries to a hard coating.

In accordance with an important adaptation of the invention, alkyd resins are modified with aluminum triacylates to provide viscous vehicles for thixotropic paints. The oil-modified resins, which in practice always contain some free hydroxyl groups, are mixed in hydrocarbon solution with 1–20% aluminum triacylate and then heated to 100–150° C. A chemical reaction proceeds resulting in a smooth gelation of the alkyd. These gels are then diluted in mineral spirits and the resulting mixtures are particularly suitable for preparing paints. Such paints do not settle in the cans; they can be brushed on easily without drag or dripping while at the same time the film flows evenly over the surface being covered and dries rapidly to a smooth coating.

Soybean-oil-modified alkyd resin in a quantity of 200 gm., containing 25% of phthalic anhydride, is dissolved in 200 gm. mineral spirits. Then a solution of 20 gm. of aluminum trilineleate (made from linseed fatty acids) in 20 gm. of linseed oil is added and the batch is heated to 140° C. for thirty minutes until it gels. Then 160 gm. of mineral spirits is added and the heating continued until a completely homogeneous viscous oil or smooth gel is obtained. The incorporation of any of the usual alkyd paint pigments by grinding into this gel containing 40% solids and the addition of a conventional drier produces a coating composition having the physical properties of the so-called gel paints.

This application is a continuation-in-part of my copending application Serial No. 489,777 filed February 21, 1955.

It should be understood that the present invention is not limited to the specific examples of compounds hereinbefore given but that it extends to all equivalents which will occur to those skilled in the art upon consideration of the general teachings as to the scope of the invention set forth herein and defined in the claims appended hereto.

I claim:

1. A process for the production of substantially pure aluminum triacylates of unsaturated higher molecular monocarboxylic acids comprising, mixing and reacting an aluminum R-oxide of a hydroxy hydrocarbon vaporizable at a temperature below the decomposition temperature of the triacylate being formed with a monobasic higher molecular unsaturated carboxylic acid in a mol ratio of approximately 1:3 in a reaction mass containing at least 3 mols of said acid per mol of said oxide during substantially the whole of the reaction period, effecting said reaction by heating at elevated temperatures which cause vaporizing off from the reacting mass the hydroxy hydrocarbon being liberated by the reaction, continuing the heating and vaporization at gradually increasing temperatures until about three molecules of liberated hydroxy hydrocarbon and as well any solvent present have been removed, whereby an aluminum triacylate is obtained in a form substantially free of side reaction products.

2. A process for the production of substantially pure aluminum triacylates of unsaturated fatty acids comprising, forming an intimate mixture of an aluminum R-oxide of a hydroxy-hydrocarbon vaporizable at a temperature below the decomposition temperature of the triacylate being formed with a monobasic unsaturated carboxylic acid in a mol ratio of approximately 1:3 by introducing the aluminum R-oxide in powdered condition into the acid in substantially cool, liquid-to-pasty condition and mixing until a homogeneous mass is obtained, thereafter heating the mixture to a temperature at which reaction proceeds and completing the reaction during heating by vaporizing off from the reacting mass with the aid of a vacuum about three molecules of hydroxy-hydrocarbon liberated by the reaction and as well any solvent in the reaction mass, whereby an aluminum triacylate is obtained in a form substantially free of side-reaction products.

3. A process for the production of substantially pure aluminum triacylates of unsaturated higher molecular monocarboxylic acids comprising, introducing an aluminum R-oxide of a hydroxy hydrocarbon vaporizable at a temperature below the decomposition temperature of the triacylate being formed into a monobasic higher molecular unsaturated carboxylic acid in liquid form in a mol ratio of approximately 1:3, respectively, heating and reacting the mixture at a temperature at which liberated hydroxy hydrocarbon vaporizes off, continuing the heating while raising the temperature to a level above 100° C. at which the liberated hydroxy hydrocarbon continues to vaporize off, as well as any solvent in the reaction mass, until about three mols of the said hydroxy hydrocarbon have been removed, whereby an aluminum triacylate is obtained in a form substantially free of side reaction products.

4. A process for the production of substantially pure aluminum triacylates of unsaturated higher molecular monocarboxylic acids of naturally occurring oil material comprising, introducing an aluminum R-oxide of a hydroxy hydrocarbon vaporizable at a temperature below the decomposition temperature of the triacylate being formed into a monobasic higher molecular unsaturated carboxylic acid of naturally occurring oil material in liquid form in a mol ratio of approximately 1:3, respectively, heating and reacting the mixture at a temperature at which liberated hydroxy hydrocarbon vaporizes off, continuing the heating while gradually raising the temperature to a level above about 135° C. at which the liberated hydroxy hydrocarbon continues to vaporize off, as well as any solvent in the reaction mass, until about three mols of the said hydroxy hydrocarbon have been removed, whereby an aluminum triacylate is obtained in a form substantially free of side reaction products.

5. The process defined in claim 4 wherein the completion of the removal of liberated hydroxy hydrocarbon is effected with the aid of a vacuum.

References Cited in the file of this patent

UNITED STATES PATENTS

| | | |
|---|---|---|
| 2,169,577 | Bradley | Aug. 15, 1939 |
| 2,582,833 | Hunn | Jan. 15, 1952 |
| 2,618,536 | Hunn | Nov. 18, 1952 |

UNITED STATES PATENT OFFICE

CERTIFICATE OF CORRECTION

Patent No. 2,835,685　　　　　　　　　　　　　　　　　May 20, 1958

Jacobus Rinse

It is hereby certified that error appears in the printed specification of the above numbered patent requiring correction and that the said Letters Patent should read as corrected below.

Column 6, line 40, for the claim reference numeral "4" read -- 3 --.

Signed and sealed this 26th day of August 1958.

(SEAL)
Attest:
KARL H. AXLINE
Attesting Officer

ROBERT C. WATSON
Commissioner of Patents